United States Patent
Ogawa

(10) Patent No.: US 9,927,637 B2
(45) Date of Patent: Mar. 27, 2018

(54) OPTICAL WAVEGUIDE ELEMENT

(71) Applicant: FUJIKURA LTD., Tokyo (JP)

(72) Inventor: Kensuke Ogawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 36 days.

(21) Appl. No.: 15/446,452

(22) Filed: Mar. 1, 2017

(65) Prior Publication Data
US 2017/0168326 A1 Jun. 15, 2017

Related U.S. Application Data

(63) Continuation of application No. PCT/JP2016/068864, filed on Jun. 24, 2016.

(30) Foreign Application Priority Data

Jun. 26, 2015 (JP) .................................. 2015-129099

(51) Int. Cl.
*G02F 1/025* (2006.01)
*G02F 1/225* (2006.01)
*G02F 1/21* (2006.01)

(52) U.S. Cl.
CPC ............ *G02F 1/025* (2013.01); *G02F 1/2257* (2013.01); *G02F 2001/212* (2013.01); *G02F 2201/063* (2013.01)

(58) Field of Classification Search
CPC .. G02F 1/025; G02F 1/2257; G02F 2001/212; G02F 2201/063
See application file for complete search history.

(56) References Cited

U.S. PATENT DOCUMENTS

| 4,974,923 A | * | 12/1990 | Colak | G02F 1/377 359/328 |
| 7,880,201 B2 | * | 2/2011 | Vlasov | G02F 1/025 257/104 |
| 7,924,492 B2 | * | 4/2011 | Kim | G02F 1/025 359/248 |
| 8,014,636 B2 | * | 9/2011 | Shubin | B82Y 20/00 257/21 |
| 8,378,465 B2 | * | 2/2013 | Vlasov | G02F 1/025 257/629 |

(Continued)

FOREIGN PATENT DOCUMENTS

CN  103439807 A  * 12/2013
JP  2012-118402 A    6/2012

(Continued)

OTHER PUBLICATIONS

Gardes et al., 40 Gb/s silicon photonics modulator for TE and TM polarisations, Opt. Express 19, 11804-11814 (2011).*

(Continued)

*Primary Examiner* — Peter Radkowski
(74) *Attorney, Agent, or Firm* — Westerman, Hattori, Daniels & Adrian, LLP

(57) ABSTRACT

To reduce the optical loss, lower the driving voltage, produce a smaller product, and simplify the production process, an embodiment of the present invention includes a rib waveguide core (101) having a rib region (101r) and two slab regions (101s), where a depletion layer (113) is so formed as to extend from the rib region (101r) to the two slab regions (101s).

11 Claims, 4 Drawing Sheets

(56) References Cited

U.S. PATENT DOCUMENTS

| | | | | |
|---|---|---|---|---|
| 8,526,090 | B1* | 9/2013 | Green | G02B 6/12 359/237 |
| 8,889,447 | B2* | 11/2014 | Green | G02B 6/12 359/237 |
| 8,916,813 | B2* | 12/2014 | Nejadmalayeri | G01J 11/00 250/227.11 |
| 8,936,962 | B2* | 1/2015 | Fujikata | G02F 1/025 438/79 |
| 8,958,678 | B2* | 2/2015 | Thomson | G02F 1/025 385/132 |
| 9,002,144 | B2* | 4/2015 | Fujikata | G02F 1/025 385/132 |
| 9,042,683 | B2* | 5/2015 | Cho | G02F 1/025 385/2 |
| 9,057,832 | B2* | 6/2015 | Green | G02B 6/12 |
| 9,128,308 | B1* | 9/2015 | Zortman | G02F 1/025 |
| 9,455,372 | B2* | 9/2016 | Vlasov | G02F 1/025 |
| 2004/0208454 | A1* | 10/2004 | Montgomery | G02F 1/2257 385/50 |
| 2006/0133754 | A1* | 6/2006 | Patel | G02B 6/122 385/129 |
| 2008/0112032 | A1* | 5/2008 | Vlasov | G02F 1/025 359/248 |
| 2009/0207472 | A1* | 8/2009 | Kim | G02F 1/025 359/276 |
| 2009/0237770 | A1* | 9/2009 | Kim | G02F 1/025 359/276 |
| 2010/0060970 | A1* | 3/2010 | Chen | G02F 1/025 359/245 |
| 2010/0215309 | A1* | 8/2010 | Shubin | B82Y 20/00 385/3 |
| 2011/0073989 | A1* | 3/2011 | Rong | G02F 1/025 257/532 |
| 2011/0111564 | A1* | 5/2011 | Vlasov | G02F 1/025 438/141 |
| 2011/0176762 | A1* | 7/2011 | Fujikata | G02F 1/025 385/2 |
| 2011/0206313 | A1* | 8/2011 | Dong | G02F 1/025 385/2 |
| 2012/0003767 | A1* | 1/2012 | Fujikata | G02F 1/025 438/31 |
| 2012/0043527 | A1* | 2/2012 | Ding | B82Y 10/00 257/28 |
| 2012/0257850 | A1* | 10/2012 | Fujikata | G02F 1/025 385/3 |
| 2012/0328237 | A1* | 12/2012 | Ide | G02B 6/13 385/14 |
| 2013/0058606 | A1* | 3/2013 | Thomson | G02F 1/025 385/14 |
| 2013/0101247 | A1* | 4/2013 | Cho | G02F 1/025 385/1 |
| 2013/0143335 | A1* | 6/2013 | Vlasov | G02F 1/025 438/22 |
| 2014/0127842 | A1* | 5/2014 | Song | G02F 1/025 438/31 |
| 2015/0293384 | A1* | 10/2015 | Ogawa | G02F 1/025 385/2 |
| 2015/0301363 | A1* | 10/2015 | Chen | G02B 6/13 385/3 |
| 2016/0004104 | A1* | 1/2016 | Feng | G02F 1/025 385/3 |

FOREIGN PATENT DOCUMENTS

| | | | | |
|---|---|---|---|---|
| JP | 2013-190492 A | | 9/2013 | |
| JP | 5413865 B1 | * | 2/2014 | G02F 1/025 |
| JP | 2014-126728 A | | 7/2014 | |
| WO | WO 2011089386 A1 | * | 7/2011 | G02F 1/025 |

OTHER PUBLICATIONS

Gosciniak et al., Theoretical investigation of graphene-based photonic modulators, Sci. Rep. 3, 1897, 2013.*
Li et al., Silicon waveguide modulator based on carrier depletion in periodically interleaved PN junctions, Optics Express, vol. 17, No. 18, p. 15947, 2009.*
Liu et al. Double-Layer Graphene Optical Modulator, Nanoletters, 2012.*
Mohsin et al., Graphene based low insertion loss electro-absorption modulator on SOI waveguide, Opt. Express 22, 15292-15297 (2014).*
Reed et al., Recent breakthroughs in carrier depletion based silicon optical modulators, Nanophotonics, vol. 3, Issue 4-5 (Aug. 2014; available online Dec. 12, 2013).*
Rosenberg et al., A 25 Gbps silicon microring modulator based on an interleaved junction, Optics Express, vol. 20, No. 24, p. 26411, 2012.*
Watts et al., Low-Voltage, Compact, Depletion-Mode, Silicon Mach-Zehnder Modulator, in IEEE Journal of Selected Topics in Quantum Electronics, vol. 16, No. 1, pp. 159-164, Jan.-Feb. 2010.*
Watts et al., "Low-Voltage, Compact, Depletion-Mode, Silicon Mach-Zehnder Modulator", IEEE Journal of Selected Topics in Quantum Elecetronics, vol. 16, No. 1, pp. 159-164, Jan. 22, 2010.
International Search Report dated Aug. 2, 2016, issued in counterpart International Application No. PCT/JP2016/068864 (5 pages).

* cited by examiner

OPTICAL WAVEGUIDE ELEMENT

This application is a Continuation of PCT International Application No. PCT/JP2016/068864 filed in Japan on Jun. 24, 2016, which claims the benefit of Patent Application No. 2015-129099 filed in Japan on Jun. 26, 2015, the entire contents of which are hereby incorporated by reference.

TECHNICAL FIELD

The present invention relates to an optical waveguide element for use in an optical integrated circuit.

BACKGROUND ART

Recent years have seen research for using an optical integrated circuit including an optical waveguide element in various devices for optical fiber communication. Examples of devices for optical fiber communication include (i) an optical-transport device for use in long-distance, metro-network wavelength-division multiplexing optical fiber communication and (ii) an optical interconnect device for use at, for example, a data center.

Patent Literature 1 discloses, as an optical waveguide element for use in an optical integrated circuit, an optical waveguide element including a core having (i) two silicon layers having respective electrical conductivities different from each other and (ii) a dielectric layer sandwiched between the two silicon layers. The optical waveguide element disclosed in Patent Literature 1 has a so-called silicon capacitor (SISCAP) structure: It includes a p-type silicon layer and an N-type silicon layer as the two silicon layers and silicon dioxide for the dielectric layer.

The optical waveguide element disclosed in Patent Literature 1 is configured such that (i) light is confined with use of the difference in refractive index between a sidewall of each silicon layer (that is, an end of each silicon layer in the direction of a substrate surface) and the cladding and that (ii) light guided through the core has an electric field that is so distributed as to spread across the two silicon layers and the dielectric layer. Changing the respective carrier densities of the two silicon layers can thus change the refractive index for light guided through the core at a central portion of the core at which central portion the two silicon layers overlap each other with the dielectric layer therebetween.

Patent Literature 1 discloses a SISCAP structure in which either the p-type silicon layer or the N-type silicon layer is bent into an L shape. Such a structure allows a region at which the carrier density is changed to extend not only in a direction parallel to the substrate surface but also in a direction perpendicular to the substrate surface.

CITATION LIST

Patent Literature

[Patent Literature 1] U.S. Patent Publication No. 2004/0208454 (publication Date: Oct. 21, 2004).

SUMMARY OF INVENTION

Technical Problem

The optical waveguide element disclosed in Patent Literature 1 is, as described above, configured such that light is confined with use of the difference in refractive index between a sidewall of each silicon layer (that is, an end of each silicon layer in the direction of a substrate surface) and the cladding. Thus, if the silicon layers have rough sidewalls, light guided through the core is scattered at the sidewalls, unfortunately resulting in a large optical loss.

Further, the optical waveguide element disclosed in Patent Literature 1 is, as described above, configured such that the region at which the carrier density is changed is limited to the central portion of the core (at which central portion the two silicon layers overlap each other with the dielectric layer therebetween) and is not present over the entire region in which the electric field of light guided through the core is distributed. This means that increasing the efficiency of refractive index modulation to lower the driving voltage requires (1) increasing the respective doping densities of the silicon layers or (2) increasing the length of the element. Increasing the respective doping densities of the silicon layers will, however, lead the carrier to absorb more light, unfortunately resulting in a large optical loss. Increasing the length of the element will unfortunately result in a larger optical waveguide element.

As a secondary issue, the optical waveguide element disclosed in Patent Literature 1 is produced through a process including a special step of disposing silicon layers on a dielectric layer. The production process is thus complicated. The optical waveguide element disclosed in Patent Literature 1 is consequently difficult to produce. In addition, it is also difficult to share a unified design rule with other optical circuits, unfortunately making it difficult to integrate the optical waveguide element together with such other optical circuits. Producing the optical waveguide element requires, for example, a technique for reducing variations in the thickness of a disposed layer to not more than 1 nm (nanometer) in order to reduce the optical loss and variations in optical property.

As another secondary issue, the optical waveguide element disclosed in Patent Literature 1 is configured such that light guided through the core has an electric field that is so distributed as to spread across the silicon layers. This causes the profile of light guided through the core to be asymmetric in a direction parallel to the substrate surface, with the result that light guided through the core contains a transverse electric field (TE) component and a transverse magnetic field (TM) component as polarized-wave components. Thus, integrating the optical waveguide element disclosed in Patent Literature 1 and a polarization-division multiplexing optical circuit causes polarized-wave cross talk, unfortunately making it difficult to transmit a polarization-division multiplexing optical signal.

The present invention has been made in view of the above issues. It is an object of the present invention to provide an optical waveguide element that has a reduced optical loss, that makes it possible to lower the driving voltage, and that has a reduced size.

Solution to Problem

In order to attain the above object, an optical waveguide element of an embodiment of the present invention includes: as a core section, a rib waveguide including (i) a protruding section and (ii) two non-protruding sections shorter than the protruding section and so arranged in a first direction as to sandwich the protruding section, the core section having a first core region and a second core region overlapping with each other in a second direction, which is perpendicular to the first direction, and configured to form a PN junction, the optical waveguide element being configured to form, between the first core region and the second core region, a depletion layer extending from the protruding section to at least one of the two non-protruding sections, the depletion layer having a position in the second direction in each of the two non-protruding sections which position is lower than a position, in the second direction, of the depletion layer in the protruding section.

The above configuration includes a rib waveguide as a core section. This allows light (that is, light guided through the core section) to be guided locally in the protruding section and its vicinity and to have an electric field distribution that does not reach the sidewalls of the core section (that is, the respective tips of the non-protruding sections). Thus, even if the sidewalls of the core section are rough, the above configuration makes it possible to reduce light scattering caused by roughness of the sidewalls and consequently reduce the optical loss. Further, the above configuration allows a depletion layer to be formed between the first core region and the second core region which depletion layer extends from the protruding section to at least one of the two non-protruding sections. This makes it possible to increase the efficiency of refractive index modulation to lower the driving voltage without (1) increasing the respective doping densities of the first core region and the second core region or (2) increasing the length of the element. The above configuration, in other words, makes it possible to lower the driving voltage without increasing the optical loss or producing a larger optical waveguide element.

Further, the above configuration makes it possible to increase the spatial overlapping between the electric field profile of guided light and the depletion layer across the entire region of the core section. This in turn makes it possible to increase the efficiency of carrier density variations and lower the driving voltage further.

In order to attain the above object, an optical waveguide element of an embodiment of the present invention includes: as a core section, a rib waveguide including (i) a protruding section and (ii) two non-protruding sections shorter than the protruding section and so arranged in a first direction as to sandwich the protruding section, the core section having a first core region and a second core region overlapping with each other in a second direction, which is perpendicular to the first direction, and configured to form a PN junction, the optical waveguide element being configured to form, between the first core region and the second core region, a depletion layer extending from the protruding section to at least one of the two non-protruding sections, in a case where the depletion layer overlaps with an electric field of guided light by a maximum area, (i) in the protruding section, the first core region having a lower surface with a height of hr/2−hs/2 in the second direction (where hs is a thickness of at least one of the two non-protruding sections, and hr is a thickness of the protruding section) relative to a height of a lower surface of the core section, and (ii) in the protruding section, the second core region having an upper surface with a height of hr/2+hs/2 in the second direction relative to the height of the lower surface of the core section.

The above configuration includes a rib waveguide as a core section. This allows light (that is, light guided through the core section) to be guided locally in the protruding section and its vicinity and to have an electric field distribution that does not reach the sidewalls of the core section (that is, the respective tips of the non-protruding sections). Thus, even if the sidewalls of the core section are rough, the above configuration makes it possible to reduce light scattering caused by roughness of the sidewalls and consequently reduce the optical loss. Further, the above configuration allows a depletion layer to be formed between the first core region and the second core region which depletion layer extends from the protruding section to at least one of the two non-protruding sections. This makes it possible to increase the efficiency of refractive index modulation to lower the driving voltage without (1) increasing the respective doping densities of the first core region and the second core region or (2) increasing the length of the element. The above configuration, in other words, makes it possible to lower the driving voltage without increasing the optical loss or producing a larger optical waveguide element.

In addition, the above configuration makes it possible to further increase the overlapping between the electric field profile of guided light and the depletion layer across the entire core section and reduce the optical loss.

Advantageous Effects of Invention

An embodiment of the present invention makes it possible to reduce the optical loss, lower the driving voltage, produce a smaller optical waveguide element, and simplify the production process.

Figure 3:
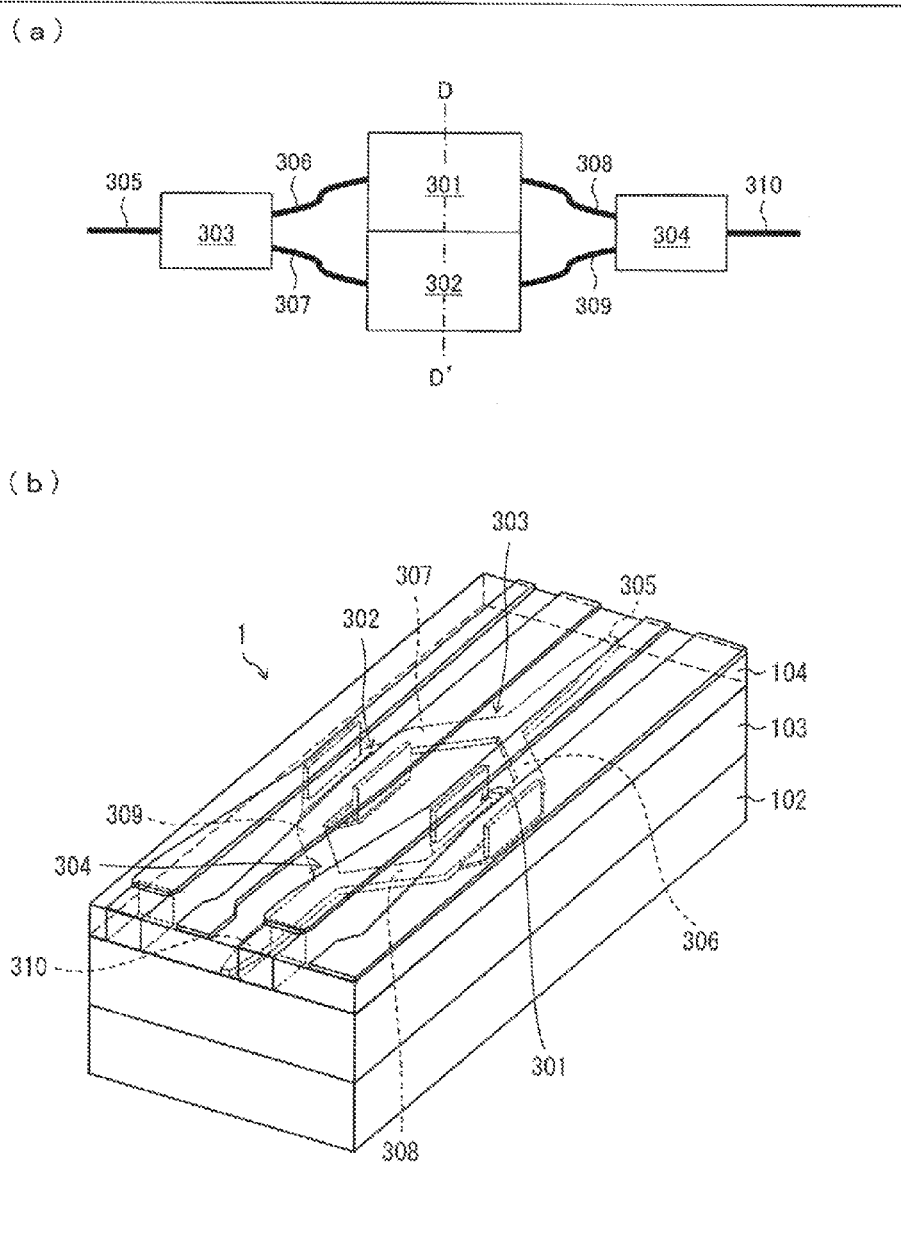

(a) of FIG. 3 is a block diagram of a Mach-Zehnder interferometer, and (b) of FIG. 3 is a perspective view of a light modulator including a Mach-Zehnder interferometer.

Figure 4:
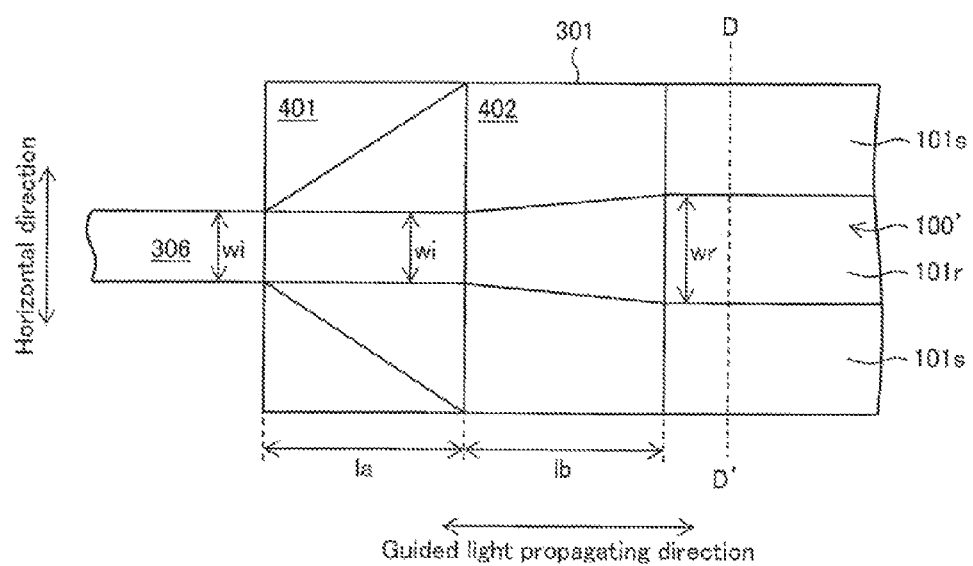

FIG. 4 is a top view of an optical waveguide element in accordance with Embodiment 2 of the present invention.

Figure 5:
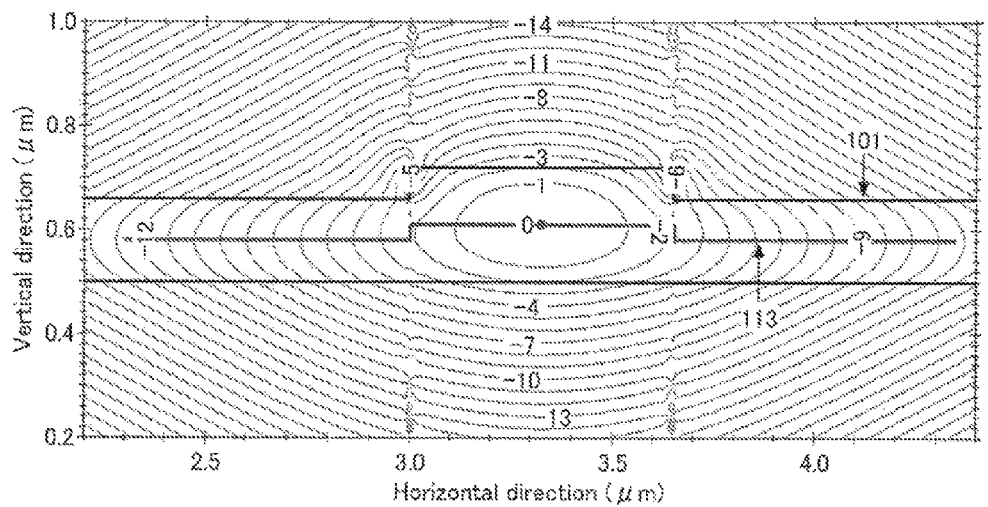

FIG. 5 is a graph illustrating an electric field profile of guided light at a depletion layer.

Figure 6:
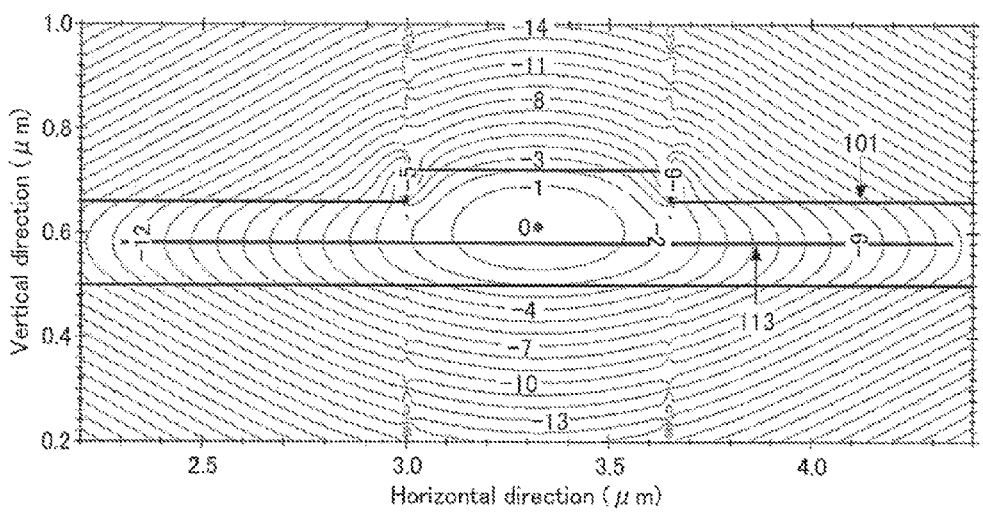

FIG. 6 is a graph illustrating another electric field profile of guided light at a depletion layer.

DESCRIPTION OF EMBODIMENTS

The following description will discuss embodiments of the present invention in detail with reference to FIGS. 1 to 6.

Embodiment 1

Figure 1:
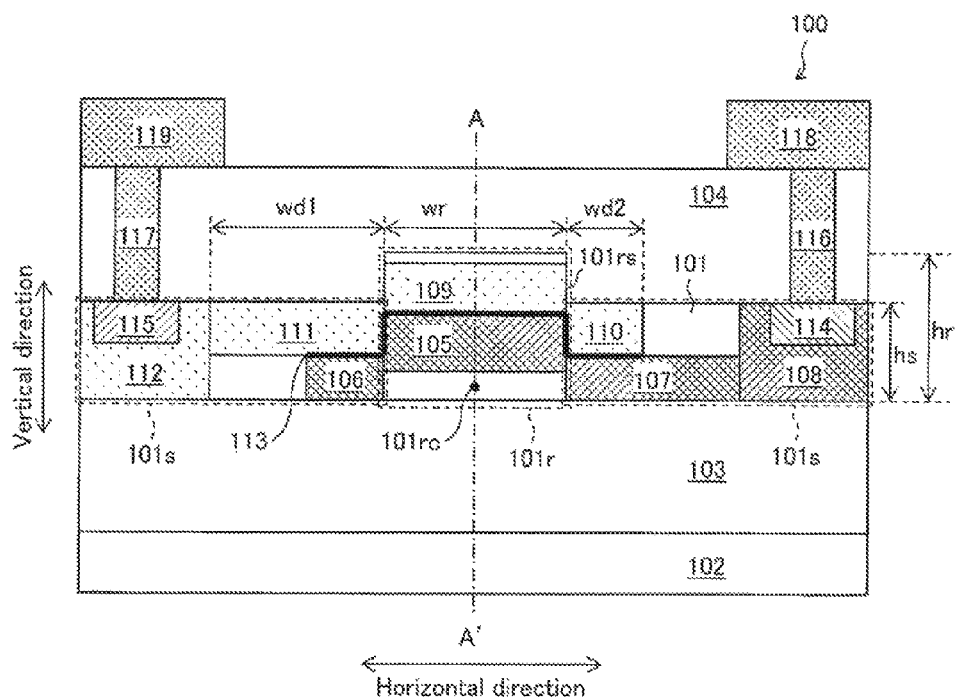
FIG. 1 is a cross-sectional view of an optical waveguide element in accordance with Embodiment 1 of the present invention.

FIG. 1 is a cross-sectional view of an optical waveguide element 100 in accordance with Embodiment 1 of the present invention. FIG. 1 also indicates a horizontal direction (first direction) and a vertical direction (second direction).

The optical waveguide element 100 includes a rib waveguide core (core section) 101, a substrate 102, a lower cladding 103, and an upper cladding 104. The lower cladding 103 lies on the substrate 102. The rib waveguide core 101 lies on the lower cladding 103. The upper cladding 104 lies on the rib waveguide core 101.

The optical waveguide element 100 is configured such that the substrate 102 and the lower cladding 103 share a flat interface. The horizontal direction indicated in FIG. 1 is parallel to the interface, whereas the vertical direction indicated in FIG. 1 is orthogonal to the interface. The vertical direction has an upper side toward the upper cladding 104 and a lower side toward the substrate 102.

The rib waveguide core 101 has (i) a rib region (protruding section) 101r at a (horizontally) central portion of the cross section illustrated in FIG. 1 and (ii) two slab regions (non-protruding sections) 101s sandwiching the rib region 101r in the horizontal direction. FIG. 1 shows the symbol "wr" to indicate the width (that is, the dimension in the horizontal direction) of the rib region 101r, the symbol "hr" to indicate the thickness (that is, the dimension in the vertical direction) of the rib region 101r, and the symbol "hs" to indicate the thickness of each slab region 101s.

The description below uses the term "protrusion section" to refer to that part of the rib waveguide core 101 which is in the rib region 101r and which protrudes above the slab regions 101s. In other words, the rib region 101r covers the protrusion section and that part of the rib waveguide core 101 which lies directly below the protrusion section.

In the cross section illustrated in FIG. 1, the rib waveguide core 101 has line symmetry with respect to an axis (indicated by the dotted-and-dashed line A-A') extending in the vertical direction through a (horizontally) central point 101rc of the rib region 101r. Further, the protrusion section has sidewalls 101rs that extend roughly in the vertical direction.

Light (that is, light guided through the rib waveguide core 101) is guided locally in the rib region 101r and its vicinity, and propagates in a direction (third direction) orthogonal to the cross section illustrated in FIG. 1. The optical waveguide element 100 is designed so that guided light propagating through the rib waveguide core 101 contains only a TE component in a fundamental mode. Guided light has a wavelength within a wavelength range used for optical communication and optical interconnect, that is, within a range of 1200 nm to 1700 nm.

The rib waveguide core 101 and the substrate 102 are each made of, for example, crystalline silicon. The lower cladding 103 and the upper cladding 104 are each made of, for example, silicon dioxide (silica). In a case where the respective materials of the rib waveguide core 101, the substrate 102, the lower cladding 103, and the upper cladding 104 are selected as above, the optical waveguide element 100 can be produced with use of an SOI (silicon-on-insulator) wafer. The rib waveguide core 101 can be an SOI layer of crystalline silicon. The lower cladding 103 can be a built-in silica (BOX) layer. The upper cladding 104 can be formed by disposing silica on the rib waveguide core 101.

Recent years have seen a widespread use of an SOI wafer including an SOI layer having a thickness of roughly 220 nm. The optical waveguide element 100 has hr of 220 nm to be capable of being produced with use of such an SOI wafer. To avoid propagation of (i) guided light of a TE component in a higher mode and (ii) guided light of a TM component, hs is preferably not less than 150 nm. Further, to prevent guided light of a TE component in the fundamental mode from being emitted from the rib waveguide core 101 and avoid attenuation of guided light, it is preferable that hs is not more than 180 nm and wr is not less than 450 nm. In a case where wr is not less than 450 nm, it is suitably possible to reduce the optical loss caused by roughness of the sidewalls 101rs.

To carry out refractive index modulation on the basis of carrier plasma dispersion caused by free carrier absorption, the rib waveguide core 101 has a PN junction. The optical waveguide element 100 has a carrier density varied at the PN junction for a refractive index change. The inventor of the present invention has invented a layout of electrically conductive regions (including a depletion layer) inside the rib waveguide core 101, and has achieved a reduced optical loss, a lowered driving voltage, and an increased modulation frequency with use of the invented layout.

As illustrated in FIG. 1, the rib waveguide core 101 has a central region (part of first core region) 105, side regions (parts of first core region) 106 and 107, and a connection region (part of first core region) 108. The central region 105, the side regions 106 and 107, and the connection region 108 all have a first electrical conductivity, and are electrically connected to one another, together constituting a first core region.

The central region 105 lies directly below the protrusion section in the rib region 101r. The central region 105 and the side regions 106 and 107 each have opposite sides extending in the vertical direction. The side region 106 has a right side in contact with the left side of the central region 105. The side region 107 has a left side in contact with the right side of the central region 105. More specifically, the side region 106 has a right side an upper portion of which is in contact with a lower portion of the left side of the central region 105, whereas the side region 107 has a left side an upper portion of which is in contact with a lower portion of the right side of the central region 105. The side regions 106 and 107 each have a thickness of approximately hs/2. The side region 106 has a left side in contact with an undoped region, in which no dopant has intentionally been implanted. The side region 107 has a right side in contact with the connection region 108. The connection region 108 has a thickness of hs. The central region 105 has a width of wr. The side region 106 has a width of wd2. The side region 107 has a width of wd1.

As illustrated in FIG. 1, the rib waveguide core 101 has a central region (part of second core region) 109, side regions (parts of second core region) 110 and 111, and a connection region (part of second core region) 112. The central region 109, the side regions 110 and 111, and the connection region 112 all have a second electrical conductivity, and are electrically connected to one another, together constituting a second core region.

The central region 109 is partially included in the protrusion section in the rib region 101r, and lies directly above the central region 105. The central region 109 and the side regions 110 and 111 each have opposite sides extending in the vertical direction. The side region 110 has a left side in contact with the right side of the central region 109. The side region 111 has a right side in contact with the left side of the central region 109. More specifically, the side region 110 has a left side an upper portion of which is in contact with a lower portion of the right side of the central region 109, whereas the side region 111 has a right side an upper portion of which is in contact with a lower portion of the left side of the central region 109. The side regions 110 and 111 each have a thickness of approximately hs/2, which is equal to the respective thicknesses of the side regions 106 and 107. The side region 110 has a right side in contact with an undoped region, in which no dopant has intentionally been implanted. The side region 111 has a left side in contact with the connection region 112. The connection region 112 has a thickness of hs. The central region 109 has a width of wr. The side region 110 has a width of wd2. The side region 111 has a width of wd1.

The optical waveguide element 100 is configured such that the central region 109 is not so tall as to reach the top of the protrusion section. However, in a case where, for example, the efficiency of refractive index modulation can be increased further without increasing the optical loss for the optical waveguide element, the central region 109 may be so tall as to reach the top of the protrusion section.

The optical waveguide element 100 is configured such that the connection regions 108 and 112 are separated from the rib region 101r in the horizontal direction. This arrangement intends to reduce the optical loss caused by free carrier absorption. The distance between the central point 101rc and the connection region 108 and the distance between the central point 101rc and the connection region 112 can each be set as appropriate in correspondence with, for example, the degree of optical loss tolerated for the optical waveguide element 100 and/or the operating frequency of the optical waveguide element 100.

The rib waveguide core 101 is configured such that the central regions 105 and 109 are so arranged as to overlap with each other in the vertical direction. The rib waveguide core 101 is configured such that the side regions 106 and 111 are so arranged as to overlap with each other in the vertical direction. The rib waveguide core 101 is configured such that the side regions 107 and 110 are so arranged as to overlap with each other in the vertical direction.

The description below assumes a case in which the first electrical conductivity (which the central region 105, the side regions 106 and 107, and the connection region 108 all have) is p-type, whereas the second electrical conductivity (which the central region 109, the side regions 110 and 111, and the connection region 112 all have) is N-type. In this case, the individual regions having the first electrical conductivity (P-type) and the individual regions having the second electrical conductivity (N-type) form a PN junction. Applying a predetermined reverse bias voltage to the portion of the PN junction causes a depletion layer 113 to be formed at the boundary of the PN junction. The depletion layer 113 is so formed as to extend from the rib region 101r toward the slab regions 101s.

The rib waveguide core 101 is configured such that the PN junction between the side regions 106 and 111 is so positioned as to be lower in the vertical direction than the position of the PN junction between the central regions 105 and 109. The rib waveguide core 101 is configured such that the PN junction between the side regions 107 and 110 is also so positioned as to be lower in the vertical direction than the position of the PN junction between the central regions 105 and 109. Thus, the depletion layer 113 in the slab regions 101s is so positioned as to be lower in the vertical direction than the position of the depletion layer 113 in the rib region 101r. This allows the rib waveguide core 101 to be configured such that the spatial overlapping is increased between the electric field profile of guided light and the depletion layer 113. This configuration makes it possible to increase the efficiency of carrier density variations and lower the driving voltage further.

Further, the rib waveguide core 101 is configured such that a right side portion of the central region 105 and a left side portion of the side region 110 are arranged next to each other in the horizontal direction and thus form a PN junction. Similarly, the rib waveguide core 101 is configured such that a left side portion of the central region 105 and a right side portion of the side region 111 are arranged next to each other in the horizontal direction and thus form a PN junction. Applying a reverse bias voltage as described above to those PN junctions form a depletion layer 113 at each of the PN junctions. The depletion layer 113 between the central region 105 and the side region 110 and the depletion layer 113 between the central region 105 and the side region 111 each extend in the vertical direction at the boundary between the rib region 101r and the corresponding slab region 101s.

Figure 2:
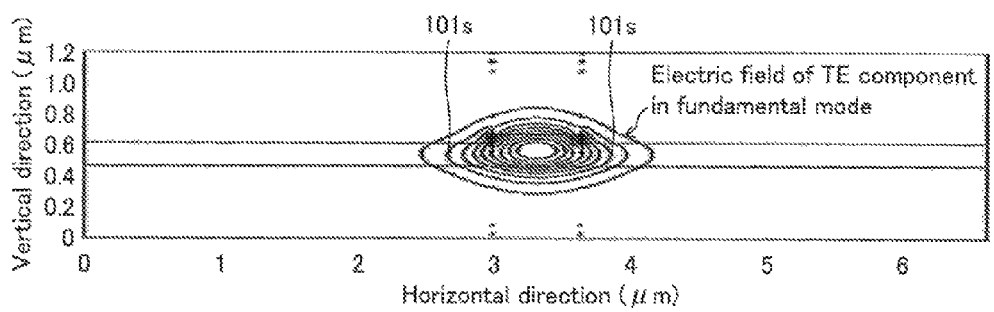
FIG. 2 is a graph illustrating an electric field profile of guided light in the cross section illustrated in FIG. 1.

FIG. 2 is a graph illustrating an electric field profile of guided light in the cross section illustrated in FIG. 1. As illustrated in FIG. 2, a TE component of guided light in the fundamental mode has an electric field profile that is present locally in the slab regions 101s as well.

FIG. 2 shows an electric field of guided light with use of a linear scale. Further, FIG. 2 shows a profile derived on the assumption that wr is 650 nm, hr is 220 nm, hs is 160 nm, and the guided light has a wavelength of 1550 nm. In a case where the depletion layer 113 in the slab regions 101s is so positioned as to be lower in the vertical direction than the position of the depletion layer 113 in the rib region 101r, the rib waveguide core 101 can be configured such that the spatial overlapping is increased between the electric field profile of guided light and the depletion layer 113.

The optical waveguide element 100 is configured such that the depletion layer 113 is partially bent at an angle of 90°. Such a bent portion may, in actuality, be rounded as a result of influence of (i) the profile of implantation of a dopant element during ion implantation and (ii) thermal diffusion during annealing. A bent portion being rounded does not cause much influence on the effect of the depletion layer 113.

A change in the reverse bias voltage to the portion of the PN junction leaves the horizontal spread (width) of the depletion layer 113 substantially unchanged, but changes the vertical spread (vertical position; thickness) of the depletion layer 113. The profile of guided light present locally at the rib waveguide core 101 indicates that the vertical spread is small; it is roughly not larger than a half the horizontal spread. This means that changing the thickness of the depletion layer 113, rather than changing the width of the depletion layer 113, easily increases the efficiency of refractive index modulation and lowers the driving voltage for the optical waveguide element 100.

With use of the above configurations and mechanisms, the optical waveguide element 100 produces the following effects:

Simply providing a protrusion section allows guided light to be present locally in the rib region 101r and its vicinity, making it possible to reduce light scattering caused by roughness of the sidewalls and thereby reduce the optical loss for the optical waveguide element 100. Further, the optical waveguide element 100 is configured such that in order to lower the driving voltage, the individual regions having the first electrical conductivity and the individual regions having the second electrical conductivity are optimized as described above. This optimization is achieved by a measure other than designing a larger optical waveguide element 100 to reduce the optical loss and lower the driving voltage. This makes it possible to avoid producing a larger optical waveguide element 100.

The depletion layer 113 extends toward the slab regions 101s. The depletion layer 113 in the slab regions 101s is so positioned as to be different (specifically, lower) in the vertical direction from the position of the depletion layer 113 in the rib region 101r. This allows the rib waveguide core 101 to be configured such that the spatial overlapping is increased between the electric field profile of guided light and the depletion layer 113 across the entire region. This configuration makes it possible to increase the efficiency of carrier density variations and lower the driving voltage further.

The connection regions 108 and 112 each have a thickness of hs, which is equal to the thickness of the corresponding slab region 101s. This configuration allows for reduction in the series resistance (that is, the resistance from a low-resistance region 114 described below to the boundary between the connection region 108 and the side region 107 and the resistance from a low-resistance region 115 described below to the boundary between the connection region 112 and the side region 111). The above configuration thus makes it possible to reduce the RC time constant, which is determined on the basis of the series resistance and the capacitance of the PN junction. The optical waveguide element 100 can therefore have an increased modulation frequency.

The optical waveguide element 100 is configured such that guided light has an electric field profile that is optimized as a result of the cross-sectional shape of the rib waveguide core 101 illustrated in FIG. 1. The shape of the depletion layer 113 is, in contrast, optimized as a result of the above-described arrangement of the individual regions having the first electrical conductivity and the individual regions having the second electrical conductivity as well as the dopant distribution, independent of the electric field profile of guided light. This makes it easy to reduce the optical loss and lower the driving voltage for the optical waveguide element 100.

FIG. 2 assumes that the optical waveguide element 100 is configured such that wr is 650 nm, hr is 220 nm, and hs is 160 nm. The respective values of wr, hr, and hs are, however, not limited to those. Various dimensions of the optical waveguide element 100 can be changed as appropriate as long as (i) guided light propagating through the rib waveguide core 101 ideally has a single mode and (ii) the depletion layer 113 is formed appropriately.

The optical waveguide element 100 is described above as being configured such that the first electrical conductivity is P-type and that the second electrical conductivity is N-type. The optical waveguide element 100 may, however, alternatively be configured such that the first electrical conductivity is N-type and that the second electrical conductivity is P-type.

The following description will discuss how to form the PN junction of the optical waveguide element 100 and a high-speed optical modulation element including a high-frequency electrode. To arrange the individual regions having the first electrical conductivity and the individual regions having the second electrical conductivity for vertical overlapping, hs is preferably not less than 100 nm.

The individual regions having the first electrical conductivity and the individual regions having the second electrical conductivity are formed by doping. This doping can be carried out by, for example, ion implantation. The description below assumes a case of implanting ions vertically from above the optical waveguide element 100 into the rib region 101r and the slab regions 101s simultaneously. In this case, the depth at which ions are implanted in the rib region 101r is roughly equal to the depth at which ions are implanted in the slab regions 101s. Thus, adjusting the respective vertical positions of (i) the upper surface of the rib region 101r and (ii) the respective upper surfaces of the slab regions 101s for a depletion layer 113 makes it possible to form a depletion layer 113 at a desired position. Implanting ions into the rib region 101r and the slab regions 101s simultaneously requires adjusting hr and hs optimally without (i) propagation of guided light in a higher mode and (ii) increase in the radiation loss of guided light.

The electric field profile of guided light illustrated in FIG. 2 indicates that in the rib region 101r, positioning the vertical center of the depletion layer 113 at a position approximately 80 nm to 100 nm below the top of the protrusion section allows the vertical center of the depletion layer 113 to roughly coincide vertically with the position at which the electric field of guided light is largest. This in turn allows the electric field profile of guided light to overlap the depletion layer 113 by roughly a maximum area. Further, in each of the slab regions 101s, positioning the vertical center of the depletion layer 113 in the vicinity of the vertical center of the corresponding slab region 101s allows the vertical center of the depletion layer 113 to roughly coincide vertically with the position at which the electric field of guided light is largest. This in turn allows the electric field profile of guided light to overlap the depletion layer 113 by roughly a maximum area.

The side regions 106, 107, 110, and 111 have respective vertical thicknesses that are equal to one another. This allows the vertical center of the depletion layer 113 in each slab region 101s to coincide with the vertical center of the slab region 101s. Even if the respective thicknesses of the side regions 106, 107, 110, and 111 involve variations of approximately not more than 5%, such variations will cause little influence on the optical property and electrical property of the optical waveguide element 100. The side regions 106, 107, 110, and 111 can thus be regarded as having an equal thickness as long as the variations are within the above range.

The respective vertical positions of (i) the upper surface of the rib region 101r and (ii) the respective upper surfaces of the slab regions 101s roughly correspond to the formation of a PN junction by implanting ions into the rib region 101r and the slab regions 101s simultaneously. Such ion implantation can simplify the process of producing the optical waveguide element 100 and improve the accuracy of producing the optical waveguide element 100. This in turn facilitates integrating the optical waveguide element 100 together with other circuits. The description below assumes a case where it is difficult to meet conditions conforming to such ion implantation or a case where there is a need to adjust the vertical center of the depletion layer 113 in the rib region 101r and the vertical center of the depletion layer 113 in each slab region 101s separately. This case simply needs ions to be implanted in the rib region 101r and in each slab region 101s separately. To activate the element implanted and improve the electrical conductivity, an annealing process may be carried out at each ion implantation stage as necessary.

The optical waveguide element 100 may be configured, as described above, such that the first electrical conductivity and the second electrical conductivity are P-type and N-type, respectively, or N-type and P-type, respectively. Which of the above combinations to use may be determined in correspondence with properties of the element to be implanted such as the diffusion coefficient.

The central region 105 and the side regions 106 and 107 can be formed through a single operation of ion implantation with self-alignment. In a case where the rib waveguide core 101 is made of crystalline silicon, the P-type ion to be implanted can be of boron, for example. Adjusting the accelerating voltage for ion implantation can form a central region 105 in the rib region 101r and side regions 106 and 107 each roughly at a lower half of the corresponding slab region 101s.

Forming the connection region 108 requires two stages of ion implantation. The first stage of ion implantation is identical to the above-described ion implantation with self-alignment. This forms a connection region 108 roughly at a lower half of the slab region 101s on the right. The second stage of ion implantation uses an optical mask or the like to limit the ion implantation region to a region directly above the connection region 108 formed above, and reduces the accelerating voltage. This allows the connection region 108 to grow up to roughly an upper half of the slab region 101s on the right.

Then, ion implantation is further carried out with an increased dose in a region covering the upper surface of the connection region 108. This forms a low-resistance region 114 having the first electrical conductivity in the connection region 108 in the corresponding slab region 101s.

The optical waveguide element 100 further includes (i) vertical through lines 116 and 117 present in the horizontal direction from the upper cladding 104, (ii) a surface electrode 118 disposed above the vertical through line 116, and (iii) a surface electrode 119 dispose above the vertical through line 117. FIG. 1 shows an arrangement in which (i) the upper surface of the low-resistance region 114 is connected to one end of the vertical through line 116 and (ii) the other end of the vertical through line 116 is connected to the surface electrode 118.

The central region 109 and the side regions 110 and 111 can be formed with self-alignment. The N-type ion to be implanted can be of arsenic, for example. Adjusting the accelerating voltage for ion implantation can form a central region 109 above the central region 105 in the rib region 101r and side regions 110 and 111 each roughly at an upper half of the corresponding slab region 101s.

Forming the connection region 112 requires two stages of ion implantation as in the formation of the connection region 108. The first stage of ion implantation is identical to the above-described ion implantation with self-alignment. This forms a connection region 112 roughly at a lower half of the slab region 101s on the left. The second stage of ion implantation uses an optical mask or the like to limit the ion implantation region to a region directly above the connection region 112 formed above, and reduces the accelerating voltage. This allows the connection region 112 to grow up to roughly an upper half of the slab region 101s on the left.

Then, ion implantation is further carried out with an increased dose in a region covering the upper surface of the connection region 112. This forms a low-resistance region 115 having the second electrical conductivity in the connection region 112 in the corresponding slab region 101s.

FIG. 1 shows an arrangement in which (i) the upper surface of the low-resistance region 115 is connected to one end of the vertical through line 117 and (ii) the other end of the vertical through line 117 is connected to the surface electrode 119.

The surface electrodes 118 and 119 are each a portion of the high-frequency electrode. The vertical through lines 116 and 117 and the surface electrodes 118 and 119 are each made of, for example, metallic aluminum or metallic copper. A high-frequency electric signal is applied to at least one of the surface electrodes 118 and 119 via a capacitor (not shown) configured to function as a direct-current (DC) block. A DC reverse bias voltage is applied, simultaneously with the above application, via an inductor (not shown) configured to function as an alternating-current (AC) block. This allows for high-speed optical modulation.

The depletion layer 113 has a width having a value that allows the depletion layer 113 to substantially entirely cover the horizontal spread of guided light. Thus, wd2 is approximately not less than 300 nm. Regarding the covering of the horizontal spread of guided light, the depletion layer 113 has opposite horizontal ends that are preferably positioned at respective points such that the guided light has an electric field having an attenuation of approximately 13 dB relative to the peak value of the electric field of guided light through the rib waveguide core 101. In a case where the horizontal spread of the depletion layer 113 is beyond the points resulting from an attenuation of approximately 13 dB from the peak value of the electric field of guided light, the capacitance of the PN junction will be increased, and the speed limit due to an RC time constant will be significant. The depletion layer 113 preferably has opposite horizontal ends so positioned as to avoid such issues.

Further, wd1 is preferably within a range of 700 nm to 1200 nm. This ensures that both the horizontal distance between the central point 101rc and the connection region 108 and the horizontal distance between the central point 101rc and the connection region 112 are roughly within a range of 1000 nm to 1500 nm.

Embodiment 2

(a) of FIG. 3 is a block diagram of a Mach-Zehnder interferometer. (b) of FIG. 3 is a perspective view of a light modulator 1 including a Mach-Zehnder interferometer. A Mach-Zehnder interferometer is advantageous in that it is, for example, not easily affected by external noise and can perform modulation operations that are highly stable against temperature changes. Mach-Zehnder interferometers are thus included in many light modulators for optical communication.

The Mach-Zehnder interferometer illustrated in (a) of FIG. 3 is configured as follows: A light-entering side waveguide 305 has a light-entering end for use in optical coupling with an optical fiber (not shown) on the light-entering side. The light-entering side waveguide 305 has a light-exiting end connected to the light-entering end of an optical divider section 303. The optical divider section 303 has (i) one light-exiting end connected to the light-entering end of an arm waveguide 306 and (ii) the other light-exiting end connected to the light-entering end of an arm waveguide 307. The arm waveguide 306 has a light-exiting end connected to the light-entering end of a phase modulation section 301. The arm waveguide 307 has a light-exiting end connected to the light-entering end of a phase modulation section 302. The phase modulation section 301 has a light-exiting end connected to the light-entering end of an arm waveguide 308. The phase modulation section 302 has a light-exiting end connected to the light-entering end of an arm waveguide 309. The arm waveguide 308 has a light-exiting end connected to one light-entering end of a light combining section 304. The arm waveguide 309 has a light-exiting end connected to the other light-entering end of the light combining section 304. The light combining section 304 has a light-exiting end connected to the light-entering end of a light-exiting side waveguide 310. The light-exiting side waveguide 310 has a light-exiting end for use in optical coupling with an optical fiber (not shown) on the light-exiting side.

The arm waveguide 306, the phase modulation section 301, and the arm waveguide 308 constitute a first arm section, whereas the arm waveguide 307, the phase modulation section 302, and the arm waveguide 309 constitute a second arm section.

The phase modulation sections 301 and 302 each include one optical waveguide element 100 illustrated in FIG. 1. More specifically, a cross section taken along D-D' in (a) of FIG. 3 corresponds to the cross section illustrated in FIG. 1.

As illustrated in (b) of FIG. 3, the light modulator 1 is a light modulator usable for optical communication. The light modulator 1 is a silicon optical modulator that modulates incoming light by applying to a silicon- (Si-) based PN junction a modulating electric field corresponding to a modulating signal. The light modulator 1 has a layered structure in which the substrate 102, the lower cladding 103, and the upper cladding 104 are stacked in this order.

The light modulator 1 is configured such that the individual sections illustrated in (a) of FIG. 3 are sandwiched between the lower cladding 103 and the upper cladding 104 as an optical waveguide serving as a Mach-Zehnder interferometer.

The light-entering side waveguide 305, the arm waveguides 306, 307, 308, and 309, and the light-exiting side waveguide 310 are each a rectangular waveguide including a rectangular core. The rectangular core is made of, for example, crystalline silicon. The rectangular core has a width of wi and a thickness of hr. In Embodiment 2, wi is 500 nm. A TE component in the fundamental mode propagates as guided light through the light-entering side waveguide 305, the arm waveguides 306, 307, 308, and 309, and the light-exiting side waveguide 310. The optical divider section 303 and the light combining section 304 include, for example, a 1×2 multimode interferometer and a 2×2 multimode interferometer, respectively. The two multimode interferometers each have a thickness of hr. The light-entering side waveguide 305, the arm waveguides 306, 307, 308, and 309, and the light-exiting side waveguide 310 each include a SOI wafer.

Inputting a high-frequency electric signal into at least one of the phase modulation sections 301 and 302 allows for light intensity modulation. Further, inputting into the phase modulation sections 301 and 302 respective high-frequency electric signals that are mutually complementary for push-pull driving allows for optical phase modulation. The high-frequency electric signals each have a symbol rate of not less than 10 Gbaud.

For the connection between the arm waveguide 306, the phase modulation section 301, and the arm waveguide 308, the optical waveguide element 100 preferably has a tapered shape such that the rib region 101r and the slab regions 101s each have a gradually varying width, in order to prevent an increase in optical loss and higher mode excitation. This is also true of the connection between the arm waveguide 307, the phase modulation section 302, and the arm waveguide 309.

FIG. 4 is a top view of an optical waveguide element 100' in accordance with Embodiment 2 of the present invention. FIG. 4 also indicates a horizontal direction and a guided light propagating direction. The guided light propagating direction indicated in FIG. 4 is perpendicular to both the horizontal direction and the vertical direction (see FIG. 1).

The optical waveguide element 100' is identical in configuration to the optical waveguide element 100 illustrated in FIG. 1 except that the rib region 101r and the slab regions 101s each have a horizontal width that varies depending on the position along the guided light propagating direction. A cross section of the optical waveguide element 100' taken along D-D' in FIG. 4 corresponds to the cross section of the optical waveguide element 100 illustrated in FIG. 1.

The optical waveguide element 100' includes, on the side of the light-entering end of the phase modulation section 301, a first tapered section 401 along the guided light propagating direction for connection with the arm waveguide 306. The first tapered section 401 has a tapered shape such that (i) the slab regions 101s each have a horizontal width that is smaller at a position closer to the side of the entry of guided light and that (ii) the slab regions 101s each have a width of roughly 0 at its light-entering end. The rib region 101r has a horizontal width of wi across the entire first tapered section 401. At the first tapered section 401, the rib region 101r has a cross-sectional shape that is roughly congruent with the cross-sectional shape of the rectangular core of the arm waveguide 306. The first tapered section 401 has a length 1a of 30 μm (micrometers) in the guided light propagating direction. The first tapered section 401 has a light-exiting end connected to the light-entering end of a second tapered section 402. In other words, the second tapered section 402 is adjacent to that end of the first tapered section 401 from which guided light is emitted.

The second tapered section 402 has a tapered shape such that the rib region 101r has a horizontal width that is smaller at a position closer to the side of the entry of guided light. At the light-entering end of the second tapered section 402, the rib region 101r has a horizontal width of wi, which is equal to that at the first tapered section 401. At the light-exiting end of the second tapered section 402, the rib region 101r has a horizontal width of wr. The second tapered section 402 has a length 1b of 30 μm in the guided light propagating direction.

The lengths 1a and 1b are not limited to 30 μm, and may be as short as possible provided that it is possible to prevent an increase in optical loss and higher mode excitation in the optical waveguide element 100'.

If the arm waveguide 306 includes a rectangular core having a width (wi) of larger than 500 nm, there will be an increased risk of higher mode excitation. Higher mode excitation will decrease the extinction ratio in light intensity modulation or the Q value in optical phase modulation.

No higher mode excitation will occur in the optical waveguide element 100' as long as the rib region 101r has a width (wr) of less than 700 nm. In view of that, the first tapered section 401 is configured such that the rib region 101r, which has a cross-sectional shape congruent with that of the rectangular core, is provided with slab regions 101s each having a horizontal width that gradually increases toward the light-exiting side. Further, the second tapered section 402 is configured such that the rib region 101r has a horizontal width that gradually increases from wi (500 nm) to wr (650 nm) toward the light-exiting side. This allows for configuration of an optical modulator element with a small optical loss and a large extinction ratio or Q value. Using the optical waveguide element 100' as a phase modulation section 301 for a Mach-Zehnder interferometer can prevent an increase in optical loss and higher mode excitation.

FIG. 4 illustrates an example of the connection between the arm waveguide 306 and the phase modulation section 301. The configuration of the optical waveguide element 100' can also be used for the connection between the arm waveguide 307 and the phase modulation section 302.

The configuration of the optical waveguide element 100' can also be used for (i) the connection between the phase modulation section 301 and the arm waveguide 308 and (ii) the connection between the phase modulation section 302 and the arm waveguide 309. In this case, the light-entering end and the light-exiting end are switched from the example of the connection between the arm waveguide 306 and the phase modulation section 301.

The phase modulation sections 301 and 302 each have a length of, for example, 3 mm (millimeters) in the guided light propagating direction.

(Respective Profiles of Depletion Layer and Electrically Conductive Regions)

FIGS. 5 and 6 each show an electric field profile of guided light at the depletion layer 113. FIGS. 5 and 6 each show an example profile of the depletion layer 113 together with contour lines indicative of absolute values of the electric field of guided light (TE mode) and the outline of the rib waveguide core 101. The contour lines are drawn in such a manner that the peak absolute value of the electric field of guided light is normalized at 1 and that the electric field absolute values are shown as separated by 1 dB. FIGS. 5 and 6 each show a point numbered "0" to indicate the peak (0 dB) of the electric field absolute values. A depletion layer 113 having the profile illustrated in FIG. 5 overlaps with the profile of the electric field of guided light by a maximum area, thereby maximizing the effect of lowering the driving voltage for the optical waveguide element 100.

In FIGS. 5 and 6, the depletion layer 113 has opposite horizontal ends each roughly positioned at a point at which the absolute value of the electric field of guided light is attenuated by 13 dB from the peak value. In this case, the horizontal spread of the depletion layer 113 is approximately 1 μm on each of the opposite horizontal sides from the position of the peak value as the center. In this case, the phase modulation sections 301 and 302 illustrated in, for example, (a) of FIG. 3 (each with a length of 3 mm) each have an electrical capacitance of the PN junction (described above) of approximately 12 pF. The PN junction is connected to a series electric resistance of approximately 8 ohms in total on both sides of the PN junction. The RC time constant is thus approximately 100 ps. Driving the optical waveguide element 100 at a symbol rate of not less than 10 Gbaud normally requires an RC time constant of roughly not more than 100 ps. The PN junction thus preferably has an electrical capacitance of 12 pF. The electrical capacitance is roughly proportional to the horizontal spread of the depletion layer 113. The depletion layer 113 thus preferably has opposite horizontal ends each positioned inward (that is, closer to the center of the depletion layer 113) of the point at which the absolute value of the electric field of guided light is attenuated by roughly 13 dB from the peak value. A similar principle applies to any case where the depletion layer 113 has a profile different from that illustrated in FIG. 5 or 6.

In each of the slab regions 101s of the rib waveguide core 101, the depletion layer 113 has a vertical position (height) of hs/2, that is, a position corresponding to half the thickness of the slab region 101s relative to the lower surface of the rib waveguide core 101. This allows the electric field profile of guided light to overlap with the depletion layer 113 by a maximum area in the slab regions 101s. Thus, in each slab region 101s, the depletion layer 113 preferably has a height of hs/2 (where hs is the thickness of each slab region 101s) relative to the height of the lower surface of the rib waveguide core 101.

The rib waveguide core 101 is configured such that the respective lower surfaces of the slab regions 101s and the lower surface of the rib region 101r have an identical vertical position, resulting in the rib waveguide core 101 having a flat lower surface. In the slab regions 101s, the side regions 106 and 107 are present at the lower half in the vertical direction, whereas the side regions 110 and 111 are present at the upper half in the vertical direction. This allows for a reduced series electric resistance. In the slab regions 101s, the side regions 106, 107, 110, and 111 each have a thickness of hs/2.

In order for the electric field profile of guided light to overlap with the depletion layer 113 by a maximum area in the rib region 101r, the depletion layer 113 has a height of hr/2 relative to the height of the lower surface of the rib waveguide core 101 in the rib region 101r.

The rib region 101r may be configured such that in order to reduce the series electric resistance, the central region 105 is thicker than the side regions 106 and 107, whereas the central region 109 is thicker than the side regions 110 and 111. This case will, however, cause an optical loss due to carrier absorption to be larger. In view of that, the optical waveguide element 100 is configured such that the central region 105 has a thickness equal to those of the side regions 106 and 107, whereas the central region 109 has a thickness equal to those of the side regions 110 and 111. The central region 105 in the rib region 101r has a lower surface with a height of hr/2−hs/2, whereas the central region 109 in the rib region 101r has an upper surface with a height of hr/2+hs/2, both relative to the height of the lower surface of the rib waveguide core 101.

The rib region 101r is configured such that an undoped region, in which no P-type or N-type dopant has intentionally been implanted, is present at least either directly above or directly below the central regions 105 and 109. This undoped region may see a slight dopant distribution due to diffusion, but that will cause little influence on the optical property of the optical waveguide element 100.

The depletion layer 113 described above can be formed by (i) forming a rib waveguide core 101 by optical lithography and dry etching and then (ii) carrying out ion implantation in the rib region 101r and the slab regions 101s separately. Ion implantation in the rib region 101r may be carried out either before or after ion implantation in the slab regions 101s. In a case where the series resistance needs to be reduced, the central regions 105 and 109 simply need to each have a larger thickness.

In the profile illustrated in FIG. 5, the depletion layer 113 extends vertically at the boundaries between the rib region 101r and the slab regions 101s. This allows for an increase in at least one of (i) the electric resistance due to the connection between the central region 105 and the side region 106, (ii) the electric resistance due to the connection between the central region 105 and the side region 107, (iii) the electric resistance due to the connection between the central region 109 and the side region 110, and (iv) the electric resistance due to the connection between the central region 109 and the side region 111. This may, however, lead to an increased series electric resistance. To avoid this, the depletion layer 113 may be shaped to extend horizontally in a straight line (with no vertically extending portion) as illustrated in FIG. 6. In this case, the depletion layer 113 has a height of hs/2 in the rib region 101r, which height is equal to that of the depletion layer 113 in the slab regions 101s. Further, in this case, the central region 109 in the rib region 101r has an upper surface with a height of hs.

To form such a depletion layer 113, ion implantation is first carried out in the rib region 101r and the slab regions 101s simultaneously. At this stage, portions that will be slab regions 101s of the rib waveguide core 101 after etching each have a thickness of hr, which is equal to the thickness of the rib region 101r. Then, optical lithography and dry etching are carried out for formation of a rib waveguide core 101, with the result of the slab regions 101s each having a height of hs.

For the purpose of integration with other circuits, the following arrangement is possible: A depletion layer 113 is formed by (i) carrying out optical lithography and dry etching for formation of a rib waveguide core 101 before ion implantation and (ii) carrying out ion implantation in the rib region 101r and the slab regions 101s simultaneously for simplification of the ion implantation step. In this case, the depletion layer 113 has a profile different from those illustrated in FIGS. 5 and 6. In the rib region 101r, the depletion layer 113 has a vertical position of hr−hs/2, and the central region 105 has a lower surface with a height of hr−hs.

As described above, the depletion layer 113 can have a profile that varies according to the highest priority; that is, whether the highest priority is to (i) increase the area of overlap between the electric field profile of guided light and the depletion layer 113 to lower the driving voltage, (ii) decrease the series electric resistance for high-speed refractive index modulation, or (iii) simplify the process for integration. In contrast, the depletion layer 113 in the rib region 101r has a vertical position (height) relative to the height of the lower surface of the rib waveguide core 101 which vertical position is within a range of not less than hs/2 and not more than hr−hs/2 (where hs is the thickness of each slab region 101s, and hr is the thickness of the rib region 101r) in a direction away from the substrate 102 (upward).

The description above deals with the optical waveguide element 100. However, the optical waveguide element 100' may also be described similarly. The description above holds true no matter whether the first electrical conductivity and the second electrical conductivity are P-type and N-type, respectively, or N-type and P-type, respectively.

SUPPLEMENTAL NOTES

An optical waveguide element of an embodiment of the present invention may include: as a core section, a rib waveguide including (i) a protruding section and (ii) two non-protruding sections shorter than the protruding section and so arranged in a first direction as to sandwich the protruding section, the core section having a first core region and a second core region overlapping with each other in a second direction, which is perpendicular to the first direction, and configured to form a PN junction, the optical waveguide element being configured to form, between the first core region and the second core region, a depletion layer extending from the protruding section to at least one of the two non-protruding sections.

The above configuration includes a rib waveguide as a core section. This allows light (that is, light guided through the core section) to be guided locally in the protruding section and its vicinity and to have an electric field distribution that does not reach the sidewalls of the core section (that is, the respective tips of the non-protruding sections). Thus, even if the sidewalls of the core section are rough, the above configuration makes it possible to reduce light scattering caused by roughness of the sidewalls and consequently reduce the optical loss. Further, the above configuration allows a depletion layer to be formed between the first core region and the second core region which depletion layer extends from the protruding section to at least one of the two non-protruding sections. This makes it possible to increase the efficiency of refractive index modulation to lower the driving voltage without (1) increasing the respective doping densities of the first core region and the second core region or (2) increasing the length of the element. The above configuration, in other words, makes it possible to lower the driving voltage without increasing the optical loss or producing a larger optical waveguide element.

The optical waveguide element of an embodiment of the present invention may be configured such that the depletion layer extends from the protruding section to both the two non-protruding sections.

The above configuration makes it possible to increase the spatial overlapping between the electric field profile of guided light and the depletion layer in the non-protruding sections. This in turn makes it possible to increase the efficiency of carrier density variations and lower the driving voltage further.

The optical waveguide element of an embodiment of the present invention may be configured such that the depletion layer has at least one end in the first direction which at least one end is positioned so that light guided through the core section has an electric field having an attenuation rate of not more than 13 dB relative to a peak value of the electric field in the core section.

In a case where the spread of the depletion layer in the first direction is beyond the points resulting from an attenuation of approximately 13 dB from the peak value of the electric field of guided light, the capacitance of the PN junction between the first core region and the second core region will be increased, and the speed limit due to an RC time constant will be significant. The depletion layer preferably has opposite ends in the first direction that are so positioned as to avoid such issues.

The optical waveguide element of an embodiment of the present invention may be configured such that in at least one of the two non-protruding sections, the first core region has a thickness in the second direction which thickness is equal to a thickness, in the second direction, of the second core region.

The optical waveguide element of an embodiment of the present invention may be configured such that in at least one of the two non-protruding sections, the depletion layer has a position in the second direction which position is different from a position, in the second direction, of the depletion layer in the protruding section.

The optical waveguide element of an embodiment of the present invention may be configured such that in at least one of the two non-protruding sections, the depletion layer has a position in the second direction which position is lower than a position, in the second direction, of the depletion layer in the protruding section.

The above configuration makes it possible to increase the spatial overlapping between the electric field profile of guided light and the depletion layer across the entire region of the core section. This in turn makes it possible to increase the efficiency of carrier density variations and lower the driving voltage further.

The optical waveguide element of an embodiment of the present invention may be configured such that the optical waveguide element has a first tapered section having a tapered shape such that the two non-protruding sections each have a width in the first direction which width is smaller at a position closer to a first one of a light-entering end and a light-exiting end of the first tapered section, and a second tapered section adjacent to a second one of the light-entering end and the light-exiting end of the first tapered section and having a tapered shape such that the protruding section has a width in the first direction which width is smaller at a position closer to a first one of a light-entering end and a light-exiting end of the second tapered section.

With the above configuration, using the optical waveguide element of an embodiment of the present invention as a phase modulation section for each arm of a Mach-Zehnder interferometer can prevent an increase in optical loss and higher mode excitation.

The optical waveguide element of an embodiment of the present invention may be configured such that in at least one of the two non-protruding sections, the depletion layer has a height of hs/2 in the second direction (where hs is a thickness of the at least one of the two non-protruding sections) relative to a height, in the second direction, of a lower surface of the core section.

The above configuration allows the electric field profile of guided light to overlap with the depletion layer by a maximum area in the non-protruding sections.

The optical waveguide element of an embodiment of the present invention may be configured such that in the protruding section, the depletion layer has a height of not less than hs/2 and not more than hr−hs/2 in the second direction (where hs is a thickness of at least one of the two non-protruding sections, and hr is a thickness of the protruding section) relative to a height, in the second direction, of a lower surface of the core section.

The above configuration allows the electric field profile of guided light to overlap with the depletion layer by a maximum area in the protruding section.

The optical waveguide element of an embodiment of the present invention may be configured such that in a case where the depletion layer overlaps with an electric field of guided light by a maximum area, (i) in the protruding section, the first core region has a lower surface with a height of hr/2−hs/2 in the second direction relative to the height of the lower surface of the core section, and (ii) in the protruding section, the second core region has an upper surface with a height of hr/2+hs/2 in the second direction relative to the height of the lower surface of the core section.

The optical waveguide element of an embodiment of the present invention may be configured such that the protruding section has an undoped region, in which no dopant has intentionally been implanted, at least either directly above or directly below the first core region and the second core region.

Each of the above configurations makes it possible to further increase the overlapping between the electric field profile of guided light and the depletion layer across the entire core section and reduce the optical loss.

The present invention is not limited to the embodiments, but can be altered by a skilled person in the art within the scope of the claims. Any embodiment derived from a proper combination of technical means each disclosed in a different embodiment is also encompassed in the technical scope of the present invention.

INDUSTRIAL APPLICABILITY

An embodiment of the present invention is applicable to an optical waveguide element for use in an optical integrated circuit.

REFERENCE SIGNS LIST 100, 100' Optical waveguide element
101 Rib waveguide core (core section)
101r Rib region (protruding section)
101s Slab region (non-protruding section)
105 Central region (part of first core region)
106 Side region (part of first core region)
107 Side region (part of first core region)
108 Connection region (part of first core region)
109 Central region (part of second core region)
110 Side region (part of second core region)
111 Side region (part of second core region)
112 Connection region (part of second core region)
113 Depletion layer
401 First tapered section
402 Second tapered section

The invention claimed is:
1. An optical waveguide element, comprising:
as a core section, a rib waveguide including (i) a protruding section and (ii) two non-protruding sections shorter than the protruding section and so arranged in a first direction as to sandwich the protruding section,
the core section having a first core region and a second core region overlapping with each other in a second direction, which is perpendicular to the first direction, and configured to form a PN junction,
the optical waveguide element being configured to form, between the first core region and the second core region, a depletion layer extending from the protruding section to both of the two non-protruding sections,
the depletion layer having a position in the second direction in each of the two non-protruding sections which position is lower than a position, in the second direction, of the depletion layer in the protruding section.

2. The optical waveguide element according to claim 1, wherein
the depletion layer extends from the protruding section to both the two non-protruding sections.

3. The optical waveguide element according to claim 1, wherein
the depletion layer has at least one end in the first direction which at least one end is positioned so that light guided through the core section has an electric field having an attenuation rate of not more than 13 dB relative to a peak value of the electric field in the core section.

4. The optical waveguide element according to claim 1, wherein
in at least one of the two non-protruding sections, the first core region has a thickness in the second direction which thickness is equal to a thickness, in the second direction, of the second core region.

5. The optical waveguide element according to claim 1, wherein
the optical waveguide element has
a first tapered section having a tapered shape such that the two non-protruding sections each have a width in the first direction which width is smaller at a position closer to a first one of a light-entering end and a light-exiting end of the first tapered section, and
a second tapered section adjacent to a second one of the light-entering end and the light-exiting end of the first tapered section and having a tapered shape such that the protruding section has a width in the first direction which width is smaller at a position closer to a first one of a light-entering end and a light-exiting end of the second tapered section.

6. The optical waveguide element according to claim 1, wherein
in at least one of the two non-protruding sections, the depletion layer has a height of hs/2 in the second direction (where hs is a thickness of the at least one of the two non-protruding sections) relative to a height, in the second direction, of a lower surface of the core section.

7. The optical waveguide element according to claim 1, wherein
in the protruding section, the depletion layer has a height of not less than hs/2 and not more than hr−hs/2 in the second direction (where hs is a thickness of at least one of the two non-protruding sections, and hr is a thickness of the protruding section) relative to a height, in the second direction, of a lower surface of the core section.

8. The optical waveguide element according to claim 7, wherein
in a case where the depletion layer overlaps with the electric field of the guided light by a maximum area,
(i) in the protruding section, the first core region has a lower surface with a height of hr/2−hs/2 in the second direction relative to the height of the lower surface of the core section, and (ii) in the protruding section, the second core region has an upper surface with a height of hr/2+hs/2 in the second direction relative to the height of the lower surface of the core section.

9. The optical waveguide element according to claim 7, wherein
the protruding section has an undoped region, in which no dopant has intentionally been implanted, at least either directly above or directly below the first core region and the second core region.

10. An optical waveguide element, comprising:
as a core section, a rib waveguide including (i) a protruding section and (ii) two non-protruding sections shorter than the protruding section and so arranged in a first direction as to sandwich the protruding section,
the core section having a first core region and a second core region overlapping with each other in a second direction, which is perpendicular to the first direction, and configured to form a PN junction,
the optical waveguide element being configured to form, between the first core region and the second core region, a depletion layer extending from the protruding section to at least one of the two non-protruding sections,
in a case where the depletion layer overlaps with an electric field of guided light by a maximum area,
(i) in the protruding section, the first core region having a lower surface with a height of hr/2−hs/2 in the second direction (where hs is a thickness of at least one of the two non-protruding sections, and hr is a thickness of the protruding section) relative to a height of a lower surface of the core section, and
(ii) in the protruding section, the second core region having an upper surface with a height of hr/2+hs/2 in the second direction relative to the height of the lower surface of the core section.

11. The optical waveguide element according to claim 1, wherein the depletion layer includes a first portion extending in the first direction and disposed in the protruding section, and two second portions extending in the first direction and disposed in the two non-protruding sections, respectively, and
wherein each of the two second portions has a position in the second direction lower than a position, in the second direction, of the first portion.

* * * * *